INVENTORS.
HENRY WALTER LEWIS
JOHN L. LARSON
BY Wolfe, Hubbard, Voit & Osann
ATTORNEYS.

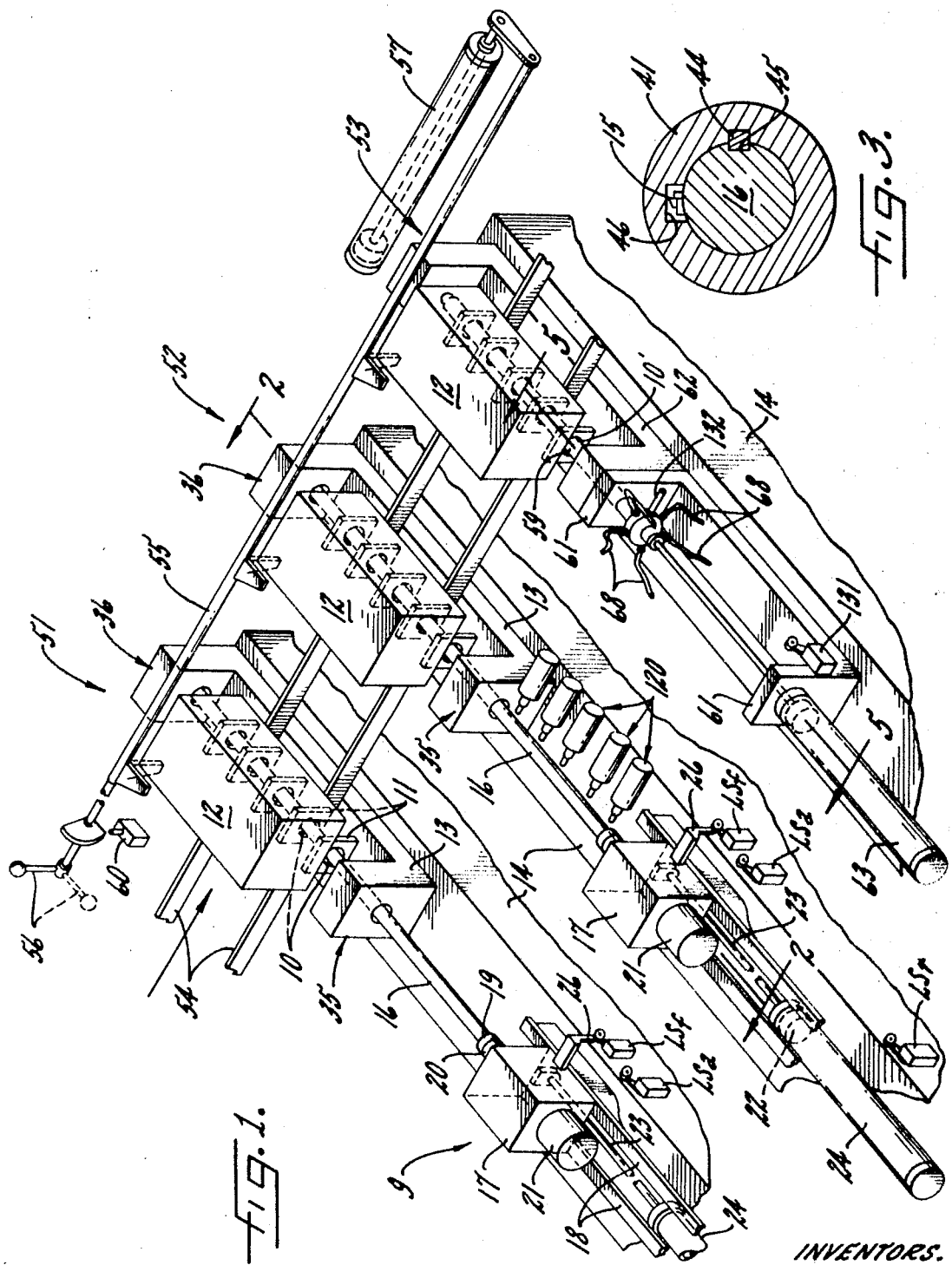

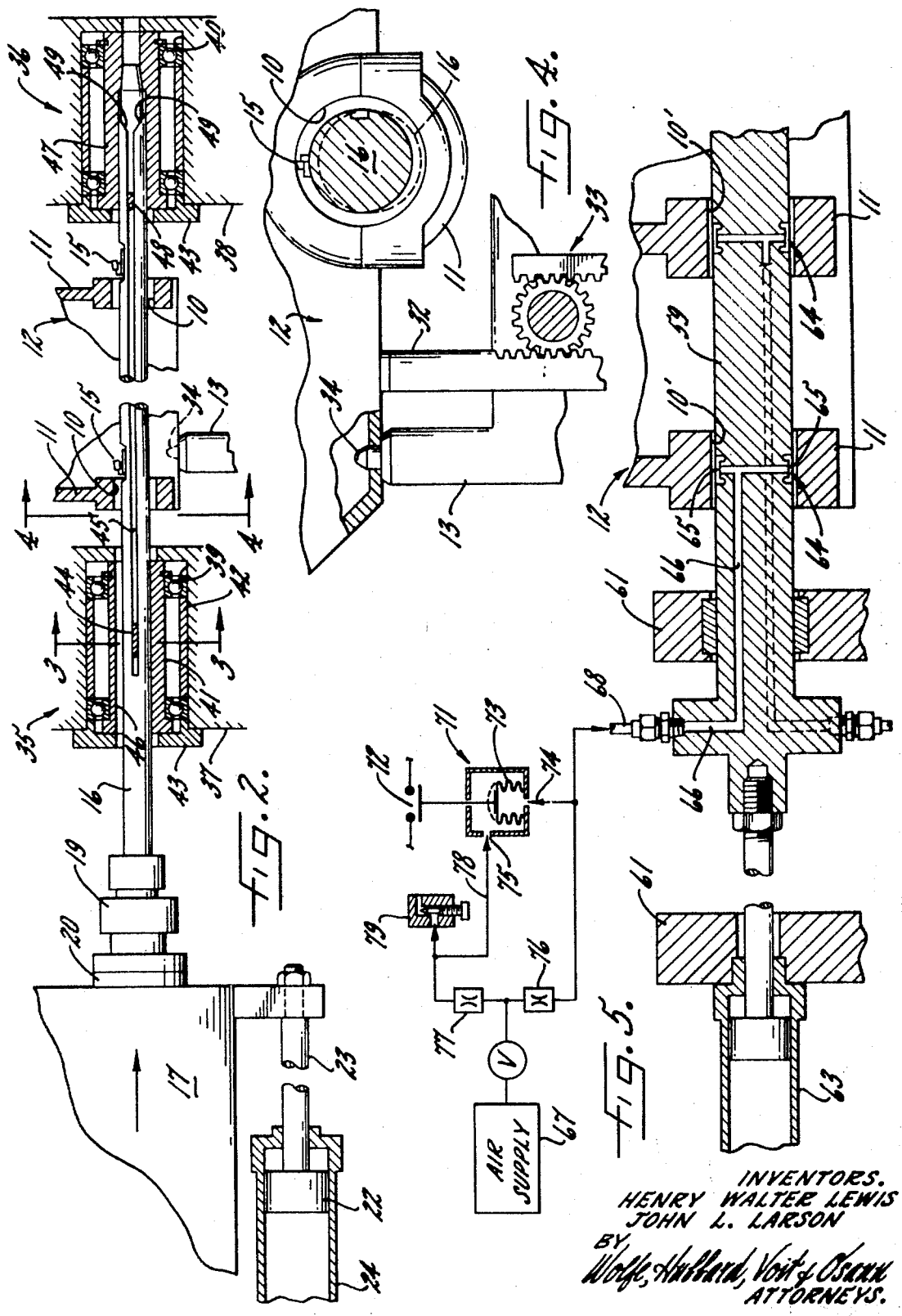

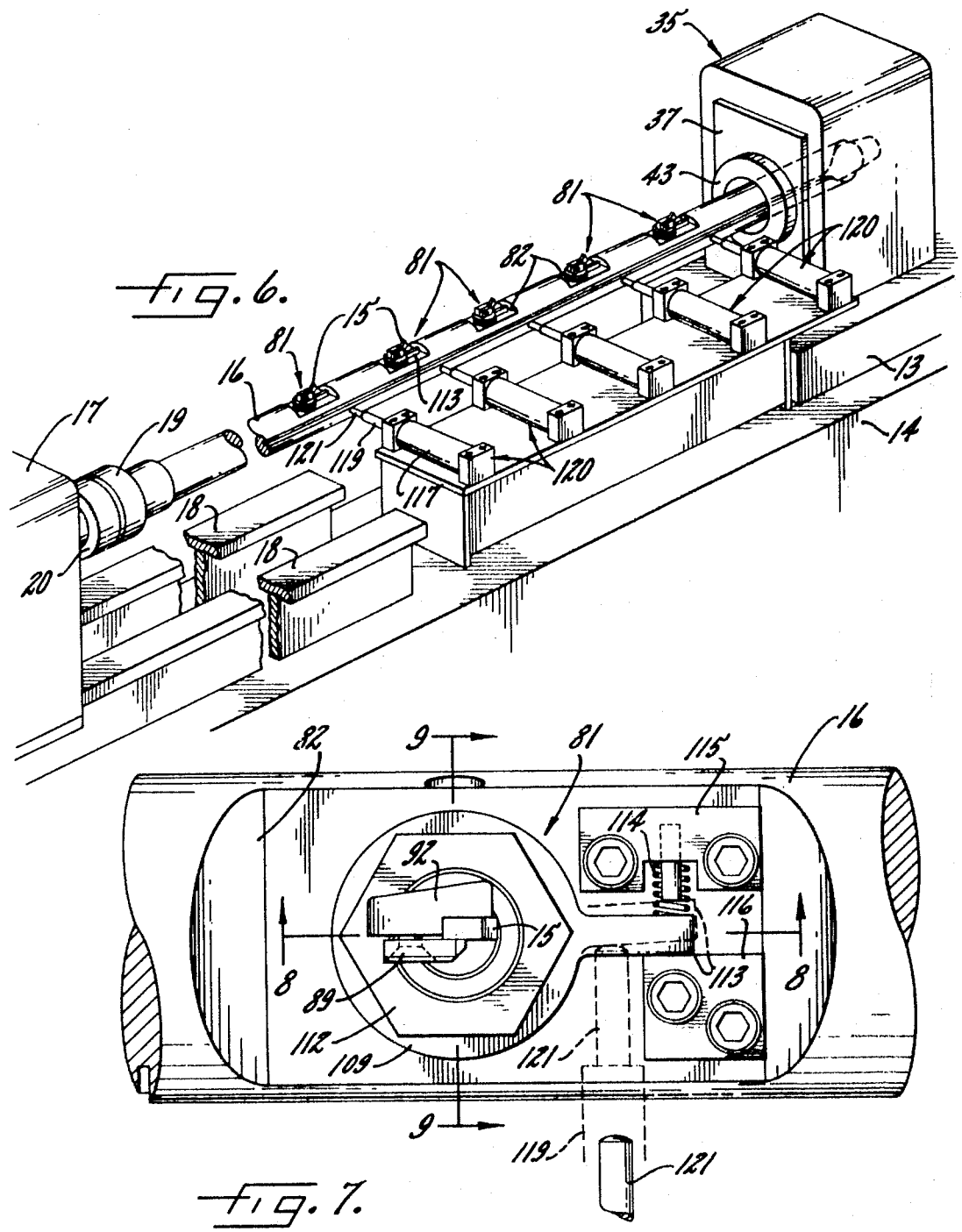

United States Patent Office 3,457,810
Patented July 29, 1969

3,457,810
BORING MACHINE WITH POWER ACTUATED TOOTH ADJUSTMENT
Henry Walter Lewis and John L. Larson, Rockford, Ill., assignors to The Ingersoll Milling Machine Company, Rockford, Ill., a corporation of Illinois
Filed Aug. 30, 1967, Ser. No. 664,361
Int. Cl. B23b 47/00, 39/16
U.S. Cl. 77—57                                                 18 Claims

ABSTRACT OF THE DISCLOSURE

Workpieces such as engine blocks are arranged in a row along a conventional machine tool transfer line and advanced step by step through and dwelled first in a boring station and then in a boring-size inspecting station. In the boring station, the axially spaced and alined holes in the cross-webs of the block are bored by cutting teeth axially spaced along and projecting radially from a rotary bar or spindle advanced rapidly into a fixtured block, fed forwardly to effect the boring, and rapidly retracted out of the block in a cycle conventional in the boring of such workpieces.

Each tooth is mounted on the bar for adjustment radially in small increments of fixed length through a screw mechanism actuated by a ratchet wheel journaled on the bar and engaging a pawl which is exposed when the bar is retracted out of the bored block and adapted to be power actuated selectively to set out the tooth by one of said increments.

The need for such tooth adjustment is determined downstream from the boring station by inspecting the bored holes with air gages to derive signals corresponding to the teeth which are boring undersize holes. The signals are stored temporarily and utilized to select the teeth to be adjusted, this being effected automatically as an incident to the next retraction of boring bar at the boring station.

Background of the invention

This invention relates to boring machines in which one or more alined holes in a workpiece are bored by cutting teeth axially spaced along and projecting radially from a rotary bar or spindle advanced rapidly into a fixtured workpiece, fed inwardly to effect the boring, and rapidly retracted in a conventional automatic cycle.

By using modern cutting and work materials, it is possible, by making short and repeated outward adjustments of each boring tooth relative to the spindle, to compensate for wearing off of the cutting edge and prolong the useful service life thereof without resharpening and while maintaining the desired accuracy of the holes bored thereby. Heretofore such adjustments have been made only manually and in increments of variable lengths.

Summary of the invention

The present invention aims to effect such adjustments in increments of fixed lengths while the boring bar is retracted and the driving member of the tooth adjusting mechanism is exposed for power actuation controlled either manually or automatically. More particularly, provision is made for inspecting the finished bore of a workpiece to determine whether the bore is undersize and to utilize such undersize measurement or signal to effect incremental outward adjustment of the tooth which bored such hole. The invention also resides in the novel manner of adjusting the boring tooth outwardly in fixed increments through the use of a toothed wheel such as a ratchet journaled on the boring bar and acting through a screw mechanism.

Brief description of the drawings

FIGURE 1 is a schematic view of a multiple station machine tool organization embodying the novel features of the present invention.

FIG. 2 is a fragmentary cross-section taken along the line 2—2 of FIG. 1.

FIGS. 3 and 4 are sections taken respectively along the lines 3—3 and 4—4 of FIG. 2.

FIG. 5 is a fragmentary view taken along the line 5—5 of FIG. 1, together with the fluid circuit of the gaging system.

FIG. 6 is a fragmentary perspective view of part of the boring machine with the boring bar retracted.

FIG. 7 is a fragmentary plan view of a part of FIG. 6.

Description of the preferred embodiments

Figure 8:
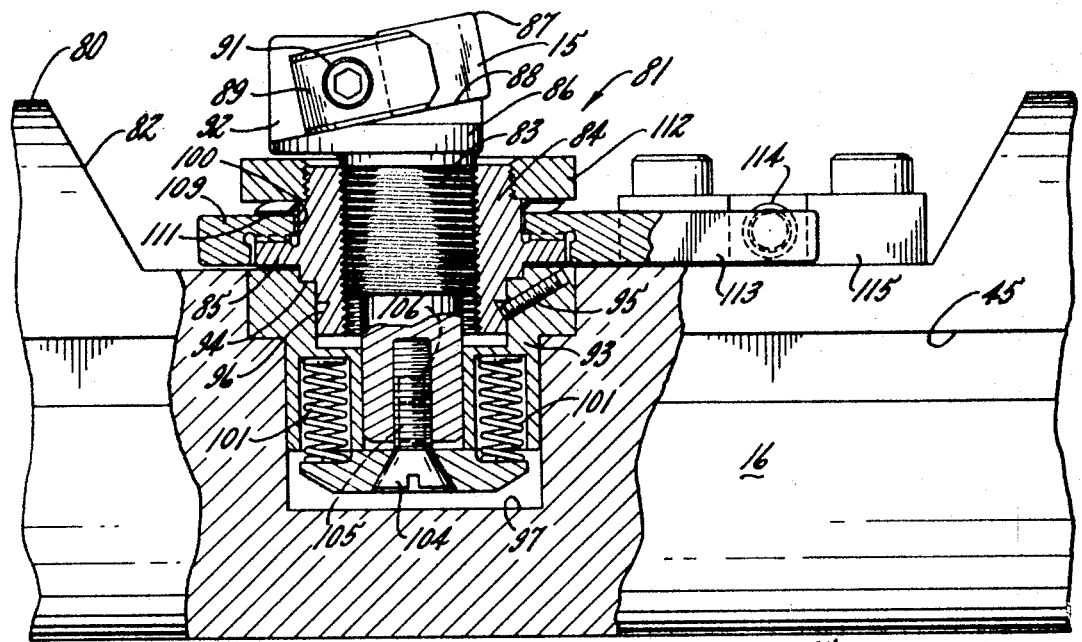
FIGS. 8 and 9 are fragmentary sections taken respectively along the lines 8—8 and 9—9 of FIG. 7.

For purposes of illustration, the invention is shown in the drawings incorporated in a boring machine 9 (FIG. 1) of the type commonly used for finish boring bearing holes 10 in the crosswebs 11 of an engine block 12 while the latter is secured to and located accurately in a fixture 13 (FIG. 4) on a bed structure 14. The boring is effected by short teeth 15 spaced along and projecting radially from a tool spindle or bar 16 supported cantilever fashion on a head 17 which is slidable back and forth along ways 18 formed on the bed and paralleling the axis of the bar. The latter is supported from the head through the medium of conventional floating tool holders 19 mounted on the outer end of a drive spindle 20 which is journaled in the head and operates during the boring to substantially aline the axes of the bar and the work holes 10.

The boring bar is driven at proper speed by an electric motor 21 on the head 17 which is advanced and retracted by a suitable power actuator herein shown as comprising a piston 22 having a rod 23 secured to the head and slidable in a cylinder 24 secured to the bed. Conventional mechanism (not fully shown) is provided for controlling the flow of fluid to opposite ends of the cylinder to advance and retract the tool head in an automatic cycle including first advancing the head rapidly from the retracted position shown in FIG. 6 to position the teeth just short of the holes to be bored, and then continuing the advance of the head to effect the boring at a slow feed rate and to the position shown in FIG. 2, and finally unclamping and raising the block followed by retracting the spindle rapidly out of the workpiece to the starting position. Such cycling of the head may be effected through conventional circuitry controlled by switches LSa, LSf, and LSr (FIG. 1) mounted on the bed structure and spaced along the path of the head so as to be actuated at proper times by a cam 26 on the head. The switch LSa is actuated when the head completes the rapid approach while the switch LSf is actuated to stop the spindle drive motor 21 and the feed of the head when the boring of the work holes is completed (FIG. 2) and initiate rapid return of the head. Actuation of the switch LSr interrupts the rapid return when the head reaches the starting position (FIG. 6). With the spindle retracted, the bored workpiece may be unloaded from the fixture and another piece placed therein.

Figure 10:
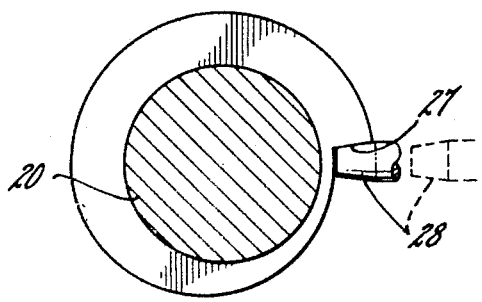
FIG. 10 is a cross-section of the boring spindle and its positioning stop.

Conventional and long used means such as a separate motor (not shown) is activated automatically after completion of a boring operation (FIG. 2) to turn the drive spindle 20 and an abutment arm 27 (FIG. 10) thereon against a retractible stop 28 and thereby locate the spindle with each cutting tooth 15 in the predetermined upright position shown in FIGS. 2, 4 and 8. The boring bar is held in this angular position as it is retracted rapidly through the finished holes and while being projected through the rough holes of the next workpiece to be bored. The switch LSa may be utilized to retract the stop 28 and deenergize the positioning motor at the end of the rapid approach movement while the motor may be energized and the stop activated under the control of the switch LSf at the end of the feed advance and completion of the boring.

During the rapid approach and rapid return movements, the work fixture is raised along the radius of the upright teeth 15 and to the position shown in phantom in FIG. 4. The cutter teeth thus offset are adapted to pass through the holes 10 of the workpiece without contact with the walls thereof. For this purpose, a workpiece, after being loaded into the fixture, is supported by plungers 32 (FIG. 4) adapted to be raised and lowered by a suitable actuator 33. In its lowered position, the workpiece is located in the fixture by suitable dowels 34.

In the rapid advance, the spindle is projected through an inboard bearing support 35, the holes 10 of the fixtured workpiece and into an outboard support 36. These supports include casings 37 and 38 rigidly secured to and upstanding from the top of the bed 14 at opposite ends of the fixture 13 formed with bores whose walls 39 and 40 are closely concentric with the axis of the drive spindle 20. Herein, the inboard bearing is of the ball type having an inner race ring 41 adapted to receive and telescope around the inboard end portion of the boring bar and an outer ring 42 telescoped closely within the bore 39 and fixed therein by caps 43. A key 44 (FIGS. 2 and 3) projecting inwardly from the interior of the inner ring 41 into a slot 45 along the boring bar serves to maintain a fixed angular relation between the ring and the bar in all longitudinal positions of the latter. In this relation, a slot 46 (FIG. 3) formed on the interior of and extending longitudinally of the inner race ring 41 is alined with the boring teeth 15 so as to permit retraction thereof through the bearing and out of the workpiece. The outboard bearing support 36 is similarly constructed and mounted including an outer ring secured in the casing 38 and an inner ring 47 having an inwardly projecting key 48 which enters between flaring walls 49 (FIG. 2) at the outboard end of the slot 45 in the bar near the end of the rapid approach movement of the latter. The ring is thus coupled positively to the bar during the boring.

The boring machine above described may be one of a plurality of stations 51, 52 and 53 in a so-called transfer line as illustrated in FIG. 1 in which workpieces such as the engine blocks above described are arranged in a row and shuttled in unison along a guide track 54 and dwelled and located in fixtures 13 at the different stations while being machined or inspected. Such step by step indexing may be effected automatically after termination of the machining cycles as by reciprocation of a bar 55 carrying arms that may, as by turning a handle 56 at a loading station, be swung laterally in behind the workpieces before the bar is advanced by a power actuator 57 which may be started by actuation of a switch 60 (FIG. 1) responsive to turning of the transfer bar into and out of work-engaging position.

The structure thus far described is conventional in the machine tool art including the automatic cycling of the tool heads at the machining stations and the correlation of the machining cycles with the indexing of the workpieces from one station to the next. In such an organization, it is customary at a downstream station 53 to inspect the holes finish bored at a previous station and provide for manual readjustment of those of the cutting teeth 15 which are boring holes smaller than the specified tolerance limit.

Such inspection may be made by standard air gaging equipment of the kind illustrated in FIGS. 1 and 5. For this purpose, a bar 59, like the boring bar 16 above described, projects cantilever fashion from and is slidable back and forth through spaced bearing supports 61 fixed to the bed 14 and supporting the bar for endwise movement back and forth into and out of the finish bored holes 10′ of a workpiece indexed into and dwelling in the inspecting station. A suitable fixture 62 in this station secures and locates the workpiece with the holes alined accurately with the axis of the bar. Advance of the bar to the feeling position shown in FIGS. 1 and 5 may be effected by a reversible power actuator 63 similar to that of the boring head 17. The actuator may be activated under manual control or automatically in a cycle synchronized with the cycle of the boring head 17. That is to say, the bar 59 is projected into the holes of the workpiece after one advance of the transfer bar 55 and retracted out of the piece before the next advance.

Spaced along the inspection bar 59 according to the spacing of the holes 10 in workpieces are conventional air gage feelers 64 (FIG. 5), one for each bore and each being of the type sold by Federal Products Corporation under the trade name Dimensionair and comprising a pair of orifices 65 opening outwardly from diametrically opposite sides of the bar 59 and each spaced a few thousandths of an inch from the surface of the finished bore 10′ when the feeler is disposed therein as shown in FIG. 5. Through a passage 66 extending backwardly along the bar beyond the outboard bearing 61 thereof, the orifices of any feeler communicate with a source 67 of compressed air through a flexible lead-in pipe 68 and mechanism 71 which is responsive to changes in the pressure in the air supply passage 66. Of course, such pressure increases as the spacing of any bore surface 10′ from the orifices 65 decreases due to wearing down of the cutting edge of the tooth 15 in the boring of holes in successive workpieces.

Wearing down of any one cutting edge to a radius that bores a hole smaller in diameter than the permissible tolerance is evidenced by closure of a switch 72 which in Federal gages results from expansion of a bellows 73 the interior of which communicates at 74 with the feeler supply pipe which is separated from the air supply by a restriction 76. Enclosing the bellows is a casing which communicates at 75 with a pipe 78 leading to the air source through a similar restriction 77. By adjusting a needle valve 79, the escape of air from the pipe may be regulated while the feeler is in a master cylinder of the desired size so that the switch 72 will be closed when the feeler is activated in a hole of that size. Thus, in accordance with accepted air gaging technique and when the inspection bar is inserted in a bored workpiece with the feeler orifices disposed within the respective bores 10′, those switches 72 corresponding to the bores which are undersize according to the previous calibration will be closed while the switches of the bores which have bored holes of acceptable diameter within the established limit will remain open. The undersize signal thus derived as evidenced by the closure of one of the switches 72 is stored temporarily and utilized in a manner to be described later in controlling the automatic set-out of the boring tooth.

In accordance with the present invention, there is built into the boring bar in association with each of the cutter teeth 15 a mechanism 81 which does not interfere with the insertion and removal of the bar into the fixtured workpieces or through the bearing ring 41, which are adapted for power actuation when the driving part thereof is exposed outside of the workpiece and the bearing support 35 and which when actuated adjusts the tooth radially and outwardly in an increment of predetermined fixed length and of extremely small magnitude, for example, .0001 or .0002 of an inch.

Each of the adjusting mechanisms is disposed within the bar and a recess 82 along the side thereof and includes generally a screw 83 supporting the tooth 15 and threaded into a nut 84 coupled to a toothed element, a ratchet wheel 85 in this instance, arranged on the bar for power actuation and having teeth of a pitch corresponding to desired length of the tooth adjusting increments desired. The screw projects transversely of the bar 16 and into the recess 82 and at its outer end is formed with a head 86 providing a seat for receiving and positioning the cutter tooth 15 which herein takes the form of a thin and flat rectangular wafer, one corner 87 of which constitutes the cutting edge. After seating of the tooth against an end surface 88 on the screw head, a clamp 89 is actuated by tightening of a screw 91 to fasten the tooth securely against the side of a lug 92 upstanding from the head 86. The tooth thus mounted is disposed at the proper cutting angles and the edge 87 is located properly for efficient finish boring of a hole 10. The tooth 15 and that portion of its mounting which projects outwardly beyond the external surface 80 of the boring bar are narrow enough to pass through the slot 46 in the inboard bearing ring 41.

Figure 9:
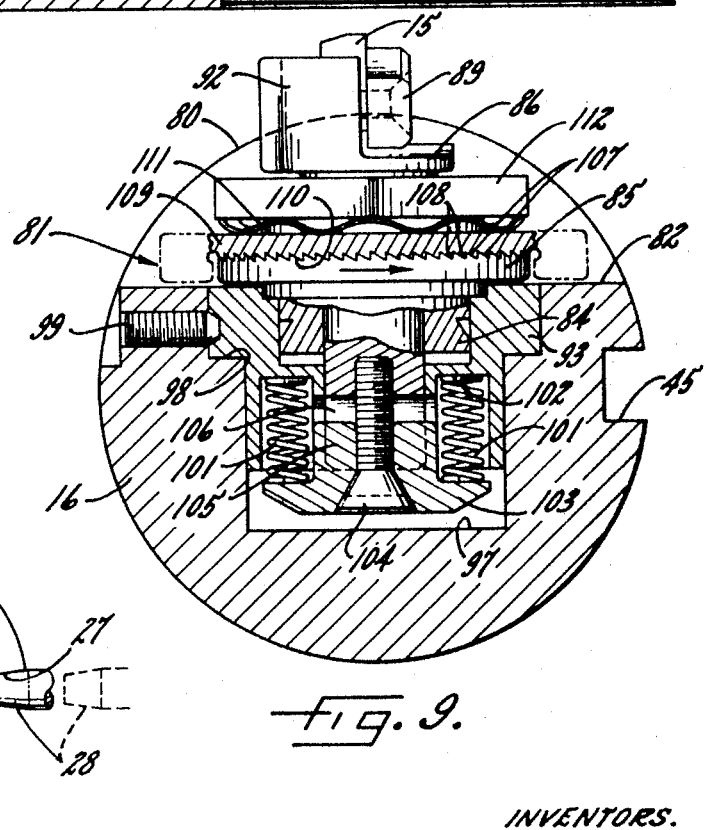

The screw 83 threads into and extends through the nut 84 which projects transaxially of the boring bar with its inner end projecting into and journaled in the outer end of a sleeve 93 with a shoulder 94 thereon abutting and held against a shoulder in the recess by a screw 95 (FIG. 8). The latter is threaded diagonally into the sleeve with its inner end projecting into a groove 96 around the nut. The sleeve is disposed in a laterally opening recess 97 in the boring bar 16, held against a shoulder 98 in the recess and locked against turning by a set screw 99 (FIG. 9). Backlash between the screw and nut is taken up by compression springs 101 acting between an inwardly facing shoulder 102 on the sleeve and a head 103 secured to the end of the screw 83 by a screw 104. A key 105 on the head projects slidably into a cross-slot 106 in the sleeve thus holding the screw 83 against turning while permitting axial yielding of the head 103.

The ratchet wheel 85 is disposed near the bottom of the bar recess 82 and herein formed integrally with and around the nut 84 with the teeth 107 thereof projecting outwardly and having trailing faces 108 disposed in radial planes and uniformly spaced around the nut axis. Yieldably urged into mesh with the ratchet teeth is a pawl in the form of a ring 109 encircling and journaled at 100 on the nut 84 adjacent the toothed face of the ratchet. Teeth 110 of the same pitch as the ratchet teeth are normally sealed in mesh with the ratchet teeth as shown in FIG. 9 by a spring 111 preferably of the wave type acting between the pawl ring and a retainer nut 112 threaded onto the outer end of the nut 84. In response to counter-clockwise angular turning (FIG. 7) of the pawl through one tooth pitch from the fully meshed position of the ratchet and pawl teeth as shown in FIG. 9, the leading faces of the pawl teeth engage the ratchet faces 108 and advance the ratchet in unison with the pawl, the nut thus being turned through the same angle thus advancing the screw endwise to set the cutter tooth 15 outwardly one step.

As the pawl ring is returned to idle position (FIG. 7), friction at the screw threads holds the ratchet against turning and, as permitted by axial yielding of the spring 111, the pawl teeth are cammed outwardly and ride over the inclined backs of the ratchet teeth until passing the tooth faces 108. Then, under the force of the spring, the pawl is shifted axially and the teeth thereof brought back into full mesh with the ratchet teeth.

To permit of power actuation of the ratchet after retraction of the boring bar to expose the adjusting mechanism 81 for a tooth 15, an arm 113 is formed integral with the pawl ring and projects radially therefrom along the bottom of the bar recess 82 and, in this instance, in the direction of advance of the bar into the work. Normally, the arm is held by a compression spring 114 (FIG. 7) against a stop 116 upstanding from the bottom of the bar recess 82 and acting between the free end of the arm and an abutment 115 on a block secured against the bottom of the bar recess 82.

When the arm 113 is swung through a small fixed angle between the idle position shown in full in FIG. 7 and the dotted position, the pawl ring 109, the ratchet 85 and the nut 84 will be turned correspondingly and the screw 83 and the cutter tooth thereon will be adjusted outwardly a precise distance determined by the extent of swinging of the arm, combined with the pitch of the ratchet teeth, and the pitch of the screw thread. By construction, these three structures are correlated in dimensions so as to produce the desired increment of tooth adjustment, preferably about .0001 of an inch each time the arm is actuated.

It will be observed from FIGS. 8 and 9 that all of the parts of the adjusting mechanism 81 for each tooth are disposed within the circumference 80 of the boring bar 16. Thus, each boring tooth 15 and its mounting lug are the only outwardly projecting parts and, as pointed out above, these are sized to pass through the slot 46 (FIG. 3) in the inboard bearing 41 and the finished holes when the latter are offset as shown in FIG. 4. At the same time, the driving member of the adjusting mechanism, in this instance the arm 113 of the ratchet pawl, is exposed and thus accessible for the limited lateral swinging across the recess 82 to index the ratchet and the nut 84 positively and one step through a fixed distance correlated with the pitch of the ratchet teeth. This is accomplished by a part which is normally retracted away from the spindle and out of the path of the driving member 113 of the adjusting mechanism. The actuating part in this instance is the end 121 of a rod 119 of a linear type power servo 120 comprising a horizontal cylinder 117 stationarily mounted on the bed 14 of the boring machine as shown in FIG. 6 with the piston 118 (FIG. 11) slidable along an axis alined with the pawl arm 113 as shown in FIGS. 6 and 7 when the boring bar is fully retracted. Upon activation of the servo by the admission of pressure fluid such as compressed air to the head end of the cylinder, the rod end moves from the retracted position spaced outwardly from the boring bar and shown in full in FIG. 7 to the dotted position which is determined by engagement of the arm 113 with the end of a pin 110 (FIG. 7). In this advance, the end is projected into and partially across the bar recess 82 to engage the arm 113 and then swings the latter to the dotted position (FIG. 7) thus turning the pawl ring and the ratchet through the angle predetermined by the position of the pin 110 and corresponding to the pitch of the ratchet teeth thus producing the desired length of the increment of outward adjustment of the cutter tooth to compensate for a detected undersize condition of the hole 10' bored thereby. The rod 121 is retracted out of the bar recess shown in full in FIG. 7 in response to the admission of pressure fluid to the rod end of the cylinder.

In the present instance, there is an actuator 120 for each of the cutter teeth 15 and these are spaced along the bed 14 so that the rods 119 thereof are alined as shown in FIG. 6 with the arms 113 of the respective tooth adjusting mechanisms 81 when the boring bar 16 is fully retracted. Thus any one or more of the teeth 15 may be set outwardly simultaneously by activating the corresponding servos 120 while the boring bar is thus retracted.

Figure 11:
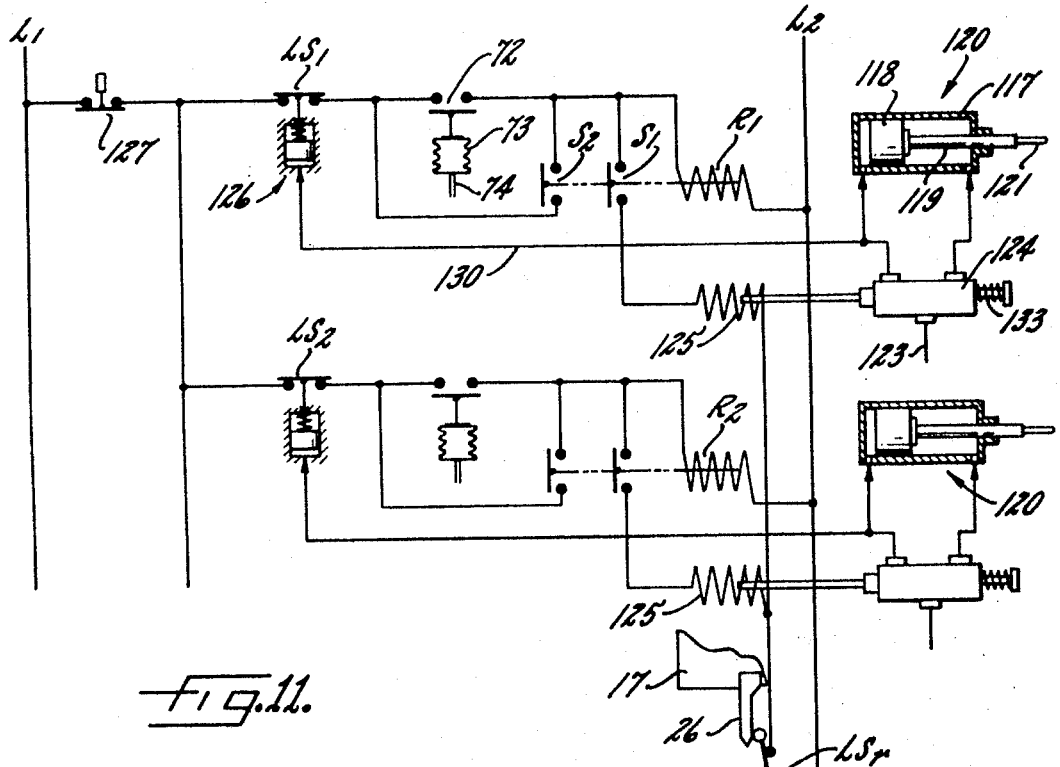
FIG. 11 is a schematic view and wiring diagram of the circuitry controlling the outward adjustment of the respective boring teeth.

Through suitable circuitry such as that shown in FIG. 11, the undersize signals derived by measuring the finished bores may be utilized to activate the tooth adjusting actuators 120 selectively and in synchronism with the cycles of the boring and inspecting machines. Considering the circuit for a first one of the actuators, compressed air from a supply line 123 is admitted to opposite ends of the cylinder 117 according to the position of a valve 124 which is shifted back and forth by the armature of a solenoid 125. Normally, when the solenoid is deenergized, air is supplied to the rod end of the cylinder thus holding the rod of the actuator retracted as shown in FIG. 6. Upon energization of the solenoid, air is released from the rod end and admitted to the head end of the cylinder causing the rod end 121 to be projected rapidly against the pawl arm 113 and the latter moved away from the stop 116 against the force of the spring and to the dotted position shown in FIG. 7.

Energization of the solenoid is controlled by the normally open switch S1 of a relay R1 whose winding is included in series with undersize signal sensing switch 72 above described corresponding to actuator 120 which is activated by the solenoid. Also included is a switch LS1 which is normally closed but is opened when the plunger 119 of the actuator 120 reaches the advanced position. The switch may be opened by a pressure responsive actuator 126 communicating through a pipe 130 with the head end of the cylinder 117 so as to be activated by the pressure which builds up in the cylinder after the piston is stopped by the rod end of the cylinder. A normally closed switch 127 in the relay circuit may be opened manually whenever it is desirable to disable the actuator 120 and prevent set out of the corresponding boring tooth.

To retain the undersize signals evidenced by closure of the respective switches 72, provision is made for maintaining energization of the relay R1 temporarily. This may be accomplished by a switch S2 which is connected in parallel with the signal switch 72 and is closed when the relay is initially energized by closure of the switch 72. Thus, the circuit for energizing the relay R1 is maintained while the inspecting bar 59 is being retracted out of the work and until the corresponding actuator 120 has completed its forward stroke and opened the circuit disabling switch LS1. Upon deenergization of the solenoid, its armature is returned to normal position by a spring 133 thus shifting the valve 124 to maintain pressure in the rod end of the servo cylinder 117.

A similar circuit is provided for controlling each of the other actuators 120. Such a circuit having a control relay R2 is shown in FIG. 11 with a similarly controlled relay R2 for energizing the associated solenoid 125 for activating this actuator and a switch LS2 for interrupting the maintaining circuit of the solenoid.

Provision is also made for preventing activation of any of the actuators 120 except when the boring and inspecting bars 16 and 59 are out of the workpieces and fully retracted as shown in FIG. 1. For this purpose, the energizing circuit for the solenoids 125 for all of the actuators includes the switch LSr above described, and closed as by the cam 26 on the boring head 17 as the head in its retracting movement reaches its fully retracted position. As the head is advanced out of this position, the switch opens automatically thus disabling the circuits of all of the solenoids 125. A second switch 131 is included in the solenoid circuits adjacent and in series with the switch LSr, this being closed as by an abutment 132 (FIG. 1) on the gage bar 59 when the latter reaches the fully retracted position. In all other positions of this bar, the switch is open.

Figure 12:
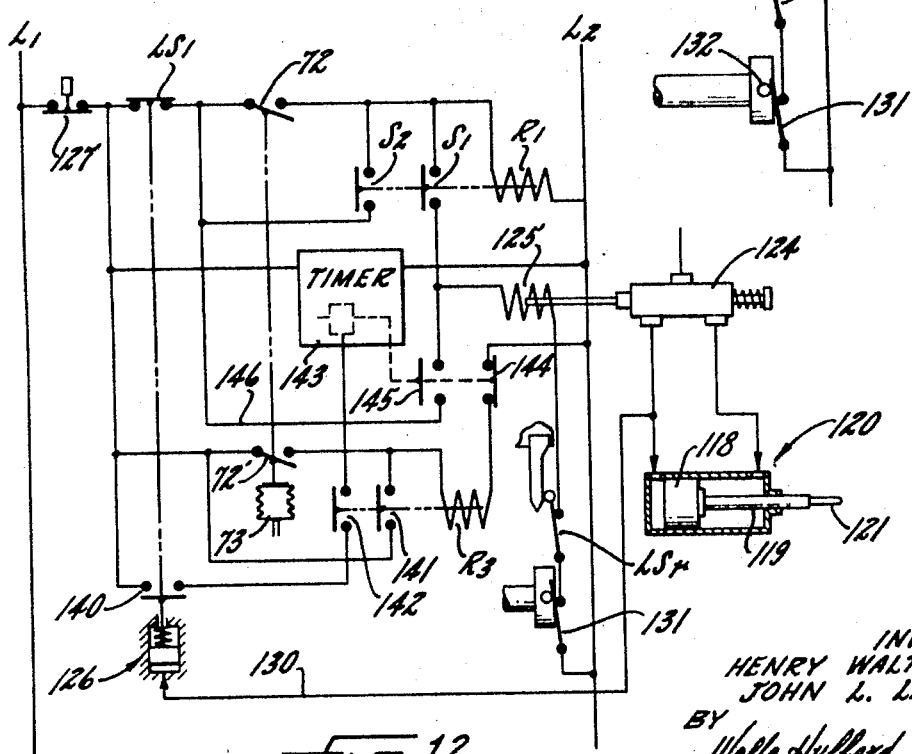
FIG. 12 is a schematic view and wiring diagram similar to FIG. 11 showing a modification.

In another aspect, the present invention contemplates measuring the extent of the undersize condition of each finished bore 10' and adjusting the corresponding tooth 15 outwardly one or more additional increments if needed in order to more nearly compensate for the total of the undersize condition. Generally stated, this is accomplished by repeating one or more times the actuating stroke of the linear actuator 120 corresponding to the tooth needing more than one of the fixed increments of adjustment. For this purpose and as shown in FIG. 12, the size sensing bellows 73 above described is adapted to close a plurality of switches 72, 72' in succession in response to the detection of an undersize condition large enough to require two or more of the increments of adjustment in order to more nearly compensate for the full magnitude of the undersize. Thus, the switch 72 is closed as before in response to a detected undersize of .0001 or more and the switch 72' is closed when the undersize is .0002 or more.

Such signals indicating different amounts of undersize may be utilized in a circuit such as that shown in FIG. 12 to repeat the tool adjusting cycles of the actuators 120 when more than one increment is required. As before and when the head 17 is retracted and the switch 72 is closed, the relay R1 is energized, sealed by the switch S2 and the switch S1 energizes the solenoid 125 and activates the actuator 120 for swinging the arm 113 and setting the tooth 15 out one step, the rod of the actuator being retracted immediately in response to opening of the pressure switch LS1.

For repeating the actuator cycle, a second relay R3 for controlling the solenoid 125 is employed along with a switch 140 which is closed by the pressure sensor 126 when the rod 119 of the actuator 120 is advanced to effect the first advance of the ratchet pawl 109. Closure of the switch 72' completes a circuit for energizing the relay R3 which circuit includes a switch 144 which is normally closed by a timer 143 which is of conventional construction and which, when activated, opens the switch 144 and closes a switch 145 after the lapse of an interval of sufficient duration to enable the rod 119 of the actuator 120 to be fully retracted following opening of the switch LS1 as above described.

Opening of the switch 144 by the timer deenergizes the relay R3 while closure of the timer switch 145 completes a circuit 146 for reenergizing the solenoid 125 thus causing the actuator 120 to execute a second cycle and thorugh the arm 113 and ratchet set the tooth 15 outwardly a second one of the fixed increments.

It will be apparent that by duplicating the circuitry above described and providing the switches necessary for detecting and recording even wider undersize conditions of a finished bore, any one of the teeth 15 may be adjusted outwardly any required number of the fixed increments before the start of the next operating cycle of the boring machine. In this way, undersize of any finished bore beyond one of the fixed increments may be compensated for automatically by a simple modification of the gaging apparatus above described.

We claim as our invention:

1. A machine tool organization for boring out a hole in the interior of a succession of workpieces having, in combination, means supporting a row of said workpieces and indexing the same successively along a predetermined path through and dwelling the pieces first in a boring machine and then in an inspecting machine, said boring machine including a head movable forth and back in an automatic cycle and a spindle projecting from the head and carrying a radially projecting tooth operable in the advance of said head to bore the hole in the workpiece dwelling in said boring machine, and said inspecting machine having a feeler movable into and out of a bored workpiece dwelling in the inspecting machine for measuring the size of the finish bored hole and producing a control signal when the inspected hole is undersize, means on said spindle supporting said boring tooth for outward radial adjustment including an exposed member mounted on the spindle for movement in steps of fixed length and adapted when actuated through one of said steps to set said tooth outwardly in a fixed increment of short length, and mechanism controllable by said signal and operable, while the tooth on said spindle is retracted out of the workpiece dwelling on said boring machine and while said member is disposed in a predetermined position outside of the workpiece, to actuate said member through one of said steps and thereby adjust said tool outwardly.

2. A machine tool organization as defined in claim 1 in which said feeler is moved into and out of a workpiece in synchronism with the advances and retractions of said boring spindle and including means for storing temporarily the signal produced by said feeler for later use in said boring machine when said spindle is out of a bored workpiece.

3. A machine tool organization as defined in claim 2 in which said mechanism is activated by the stored signal when both said spindle and feeler are in predetermined retracted positions.

4. The combination as defined in claim 1 including a device for receiving said undersize signal from said inspecting feeler and storing the same temporarily and said mechanism is activated automatically in response to said stored signal when said member reaches said predetermined position as a result of retraction of the boring spindle.

5. In a boring machine, the combination of, a support a tool head mounted thereon for reciprocation back and forth along a rectilinear path between retracted and advanced positions, a rotatable spindle mounted on and projecting cantilever fashion from said head parallel to said path, a plurality of boring teeth spaced along said spindle and each projecting from the spindle, mechanisms in said spindle supporting the respective teeth for outward radial adjustment to increase the diameter of work holes bored thereby, each of said mechanisms including a toothed wheel journaled on said spindle ot turn about an axis perpendicular thereto and having teeth pitched to set the associated cutting tooth outwardly a predetermined increment during the advance of the ratchet one tooth pitch, gaging means including feelers engageable with the respective bores of a workpiece after machining thereof by said teeth to measure the diameters thereof and give signals indicative of proper size or undersize of said holes, and mechanism controlled selectively by said signals while said spindle is retracted out of a workpiece and operable to advance one tooth pitch each of said wheels whose corresponding tooth has bored an undersize hole and whereby to set out such tooth a corresponding increment.

6. A boring machine having, in combination, a support, a rotatable spindle mounted on said support for forth and back endwise reciprocation into and out of a workpiece having a hole to be bored, a boring cutter tooth projecting radially from said spindle and operable to bore said hole during the advance of the spindle, means within said spindle supporting said tooth for outward radial adjustment, mechanism movably mounted within said spindle for adjusting said tooth outwardly including a member exposed at the side of the spindle and adapted when advanced through a fixed distance to set said tooth outwardly a corresponding fixed increment, and power actuated means mounted on said support along the path of reciprocation of said spindle and adapted when activated with said tooth disposed outside of the workpiece to engage said member and move the same through said fixed distance.

7. The combination with the boring machine defined in claim 6 including mechanism for measuring the size of the finished hole bored in workpieces by said tooth in cycles of said boring machine and producing a signal indicating when the measured hole is undersize, and mechanism controllable by said signal and operable, while said adjusting member is disposed in a predetermined position outside of the workpiece and associated with said power actuated means, to activate the latter automatically and thereby adjust said tooth outwardly through one of said increments.

8. The combination defined in claim 6 including means for temporarily storing the undersize signals produced by said measuring mechanism.

9. A boring machine as defined in claim 6 in which the actuation of said member in said predetermined position of said head is effected by the projection of a plunger transaxially of the spindle and to a position of engagement with a part of the spindle movable with said member in each of its tooth adjusting steps.

10. A boring machine as defined in claim 6 in which said tooth adjusting mechanism includes a ratchet wheel journaled on said spindle to turn about an axis extending transversely of the spindle and which includes an inboard bearing supporting said spindle during the boring and having an inner raceway slotted to permit passage of said tooth therethrough during advance and retraction of the spindle, said ratchet wheel being journaled within said spindle so as to pass through said bearing during the advance and retraction of said head.

11. A boring machine as defined in claim 6 in which said indexable member comprises a ratchet wheel journaled on and within said spindle and engageable wtih a pawl mounted on said spindle and advanced and retracted back and forth by swinging of an arm carried by the spindle and presented to said power actuated means by movement of said head to a predetermined position.

12. A boring machine as defined in claim 6 in which said tooth supporting means and said mechanism includes a non-rotatable screw within said spindle extending transaxially thereof and supporting said tooth at its outer end, a nut threaded onto said screw and journaled within said spindle to turn relative thereto and adjust said screw and tooth radially, and a ratchet wheel coupled to said nut to turn about an axis extending transaxially of the spindle, and said power actuated means includes a pawl engageable with the teeth of said ratchet wheel and mounted for movement between active and idle positions, and power actuated means mounted on said support and operable, when activated with said pawl engaging said ratchet wheel, to advance the wheel a fixed distance and thereby set out said tooth a corresponding fixed increment.

13. A boring machine as defined in claim 12 in which said pawl is movably mounted on said spindle in continuous engagement with the teeth of said ratchet wheel and is outwardly exposed for actuation by a power operated actuator mounted on said support and movable transversely of said spindle into and out of a position of active engagement with said pawl in a predetermined retracted position of the spindle.

14. A boring machine as defined in claim 12 in which the driven element of said actuating means is projected against an arm extending along the spindle and is disposed in a laterally opening recess therein.

15. A boring machine as defined in claim 14 in which said wheel is formed with an annular series of teeth facing transaxially of said spindle and said pawl is a ring journaled on said nut and having teeth engageable with said ratchet teeth, and including means yieldably urging said pawl ring axially along the nut into engagement with said ratchet teeth, said arm projecting rigidly from said pawl ring.

16. A boring machine as defined in claim 15 including a stop engageable with said arm to determine the retracted position of said pawl ring and spring means normally holding the arm against the stop.

17. In a boring machine, the combination of, a support, a tool head mounted thereon for reciprocation back and forth along a rectilinear path between retracted and advanced positions, a rotatable spindle mounted on and projecting from said head parallel to said path, a boring tooth projecting radially from said spindle and supported therein for radial adjustment to vary the diameter of a work hole bored thereby, a shaft journaled in said spindle to turn about an axis perpendicular thereto, motion reducing means mounted in said spindle and converting the turning of said shaft into corresponding outward adjusting of said tooth, a ratchet member coupled to said shaft and rotatably mounted on said spindle for step by step indexing to turn said shaft and adjust said tooth outwardly in an increment of fixed length in each of said stops, power actuated mechanism mounted on said support and brought into association with said member when said head is in a predetermined retracted position, and means for activating said mechanism with the head in said predetermined position whereby to advance the member through one of said steps and set out said toothed one of said increments.

18. A boring machine having, in combination, a support, a rotatable spindle mounted on said support for forth and back endwise reciprocation into and out of a workpiece having a hole to be bored, a boring cutter tooth projecting radially from said spindle and operable to bore said hole during the advance of the spindle, means within said spindle supporting said tooth for outward radial adjustment, mechanism movably mounted within said spindle for adjusting said tooth outwardly including a member exposed at the side of the spindle and adapted when advanced through a fixed distance to set said tooth outwardly a corresponding fixed increment, power actuated means mounted on said support along the path of reciprocation of said spindle and adapted when activated with said tooth disposed outside of the workpiece to engage said member and move the same through said fixed distance, mechanism for measuring the size of the finished hole bored in workpieces by said tooth in cycles of said boring machine and producing and temporarily storing a first signal indicating when the measured hole is a predetermined amount undersize and second signal indicating a predetermined greater amount of undersize, mechanism controllable by said signal and operable, while said adjusting member is disposed in a predetermined position outside of the workpiece and associated with said power actuated means, to activate the latter automatically and thereby adjust said tooth outwardly through one of said increments in response to said first signal and while repeating the activation of said power actuated means to further set the tooth outwardly an additional one of said increments in response to said second signal.

References Cited
UNITED STATES PATENTS

| | | | |
|---|---|---|---|
| 777,952 | 12/1904 | John | 77—57 |
| 2,484,480 | 10/1949 | Anderson | 77—56 |
| 3,121,350 | 2/1964 | Warsewa et al. | 77—57 |
| 3,300,010 | 1/1967 | Irish | 77—58 |

GERALD A. DOST, Primary Examiner

U.S. Cl. X.R.

77—1, 58